United States Patent
Capitani

(10) Patent No.: US 8,778,250 B2
(45) Date of Patent: Jul. 15, 2014

(54) METHOD OF MANUFACTURING A CONTAINER ASSEMBLY AND A CONTAINER ASSEMBLY

(75) Inventor: Stefano Capitani, Milan (IT)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 13/508,132

(22) PCT Filed: Nov. 2, 2010

(86) PCT No.: PCT/EP2010/006673
§ 371 (c)(1),
(2), (4) Date: Jun. 11, 2012

(87) PCT Pub. No.: WO2011/054493
PCT Pub. Date: May 12, 2011

(65) Prior Publication Data
US 2012/0279973 A1    Nov. 8, 2012

(30) Foreign Application Priority Data
Nov. 6, 2009    (EP) .................................... 09252565

(51) Int. Cl.
*B29C 45/14*    (2006.01)
*B29C 45/16*    (2006.01)

(52) U.S. Cl.
USPC ............................. 264/264; 264/255; 264/274

(58) Field of Classification Search
None
See application file for complete search history.

(56) References Cited

U.S. PATENT DOCUMENTS

| | | | |
|---|---|---|---|
| 4,079,567 A | 3/1978 | Spruyt et al. | |
| 4,283,458 A | 8/1981 | Igarashi et al. | |
| 4,440,311 A | 4/1984 | Hoffmann et al. | |
| 4,529,100 A | 7/1985 | Ingemann | |
| 4,971,220 A | 11/1990 | Kaufman et al. | |
| 5,634,567 A | 6/1997 | Hekal | |
| 5,705,112 A * | 1/1998 | Gram | 264/242 |
| 5,779,841 A * | 7/1998 | Yamanaka | 156/245 |
| 5,846,582 A | 12/1998 | Mayfield et al. | |
| 6,112,928 A | 9/2000 | Black et al. | |
| 2003/0152669 A1 | 8/2003 | Vadhar et al. | |
| 2007/0272688 A1 | 11/2007 | Longo et al. | |

FOREIGN PATENT DOCUMENTS

| | | |
|---|---|---|
| DE | 19706734 | 8/1998 |
| EP | 0073356 | 3/1983 |
| EP | 0481943 | 4/1992 |
| EP | 1127809 | 8/2001 |
| EP | 1714907 | 10/2006 |
| FR | 2618411 | 1/1989 |
| FR | 2827841 | 1/2003 |
| GB | 2382569 | 6/2003 |
| JP | 3-53476 | 5/1991 |
| WO | WO9101213 | 2/1991 |
| WO | WO0053510 | 9/2000 |
| WO | WO2004048200 | 6/2004 |
| WO | WO2005039997 | 5/2005 |

* cited by examiner

*Primary Examiner* — Monica Huson
(74) *Attorney, Agent, or Firm* — Thomas C. Lagaly

(57) ABSTRACT

A method of manufacturing together a support (10) and frame (20) of a container assembly (1), the method comprising:
providing a single mold (100) with a first cavity (110) defining the support (10) and a second cavity (120) defining the frame (20);
injecting first material into the first cavity (110); and
injecting second material into the second cavity (120);
wherein the first and second materials are different materials.

8 Claims, 5 Drawing Sheets

METHOD OF MANUFACTURING A CONTAINER ASSEMBLY AND A CONTAINER ASSEMBLY

TECHNICAL FIELD

The present invention relates to a method of manufacturing a container assembly and a container assembly. The container assembly is a reclosable package, such as a reclosable food package. The container assembly may be hermetically sealed with a flexible cover.

BACKGROUND ART

Hermetically sealed containers, such as trays with a flexible lid sealed around their edges, are widely used in the packaging of food products. This type of packaging offers several advantages: the rigidity of the container provides protection to the contents of the package during transportation, storage and handling, and the hermeticity of the seals contributes to the increase in the shelf-life of the product.

Reclosable packages are convenient for a variety of reasons. For example when the packaged product is not immediately consumed after opening of the package, it could undergo contamination and spoilage. To avoid this inconvenience consumers are often forced to time-consuming repackaging operations.

WO 2005/039997 discloses a reclosable rigid container assembly which comprises a support and a frame in which the support comprises a peripheral flange outwardly extending from the support. The frame comprises a rim and is shaped at its edge to co-operate with the flange to be realisably secured onto the support wherein the container assembly is in the closed state. The rim of the frame extends over a fraction of the flange thus leaving a central area of the support and the remaining part of the flange not covered by the rim of the frame. In one embodiment the frame is separate from the support and in another embodiment the frame is attached to the support by a hinge. A flexible cover is sealed to the frame and the peripheral flange and can be removed from the flange by removing the frame from the support. A difficulty with the container assembly of WO 2005/039997 is that either the container assembly is made of a single material in a one-step operation (which is undesirable because this does not enable the frame to be significantly less stiff than the support, thereby making opening of the container assembly problematic) or it requires the support and frame to be made separately and connected together in a further step (this being difficult to arrange and time consuming).

FR 2,618,411 describes a package composed of a rigid single-piece container having a ring moulded around its flange and a film sealed onto both the ring and the flange of the container. To open the package the ring is broken away from the flange of the container and the film peeled away from the flange. However, once reclosed, the package of this invention does not offer the required degree of reliability as there is no engagement between the frame and the flange of the container. A further difficulty with the container assembly of FR 2,618,411 is that the container assembly is made of a single material, thereby making it difficult to achieve the required degree of stiffness of the container whilst achieving the required degree of flexibility of the frame to allow peeling off of the film which seals the container assembly.

An object of the present invention is to provide a method of manufacturing a container assembly comprising a support and frame. Another objective is to provide a container assembly, preferably one which can be manufactured in a one-step manufacturing method.

DISCLOSURE OF INVENTION

According to the present invention there is provided a method of manufacturing together a support and frame of a container assembly, the method comprising: providing a single mould with a first cavity defining the support and a second cavity defining the frame; injecting first material into the first cavity; and injecting second material into the second cavity; wherein the first and second materials are different materials.

Therefore the frame and the support can be manufactured together in the same mould and do not need to be manufactured separately even though the frame and support are made of different materials. This is achieved by providing a single mould with first and second cavities which define the support and frame respectively.

Preferably the first cavity and second cavity are adjacent so that the frame and support are moulded in place with the frame extending around the side walls of the support. This means that there are no further steps required to bring the container assembly into a form in which it can be shipped to a customer and in which it is ready for filling and sealing without further manipulation. That is, the customer receives the support and frame in the correct juxtaposition so that product may be filled into the support and a flexible cover attached and sealed over the frame and support to seal the product in the support. A user may then open the container assembly by bending the frame over the support thereby breaking a seal between the flexible cover and the support. The support may be re-closed by replacing the frame with attached flexible cover onto the support. During this whole procedure the flexible cover remains attached to the frame.

Preferably the frame is attached to the support. This helps during transport as well as during application of the flexible cover to ensure that the frame and support do not get detached from one another. In one embodiment the frame may be attached to the support by at least one member extending between the support and the frame, wherein the member is breakable with a lower force than the frame and support so that by breaking the at least one member the frame can be moved from its position surrounding the support. This is advantageous because then the frame does not need to over lie (for example lie on) the support. This frees up the choice of materials which can be used for making the frame and the support. In this embodiment during injecting the first material and/or during injecting said second material a hinge between the frame and the container may be formed such that when the member is broken the frame can be rotated relative to the support without becoming detached from the support.

In an embodiment the frame may be attached to the support in a removable way, for example by a mechanical interlock between a part of the frame and a part of the support, for example by mechanical clipping. This is advantageous as it allows the frame to be replaced back on the support after opening of the support.

In one embodiment the first and second materials are incompatible such that they do not bond to one another. That is, they do not bond together during the method of the invention. In one embodiment the first material comprises a low density polyethylene or rubber modified polypropylene. In another embodiment the second material comprises amorphous polyethylene terephthalate, desirably mono amorphous polyethylene terephthalate. It is advantageous to use these materials if there is overlap between the frame and the support (e.g. the frame lies on the support). This is because those two materials are incompatible and when one is over injected or injected next to another, no sealing between those two materials occurs (e.g. no bond is made between these materials). Furthermore these materials have desirable stiffnesses for their respective rolls.

Preferably the first material is less stiff than the second material, preferably wherein the first material has a flexural modulus in the range of 900 to 3500 MPa and/or the second material has a flexural modulus in the range of 90 to 700 MPa. This allows easy opening of the container assembly by bending of the frame back on itself, for example through 180°, when removing from the support a film attached to the frame and the support. Without being able to bend the frame through a large angle, it becomes difficult to remove the film from the support.

In one embodiment injecting the first material is performed after injecting the second material or vice versa. In this embodiment, the method may further comprise moving part of the mould between injecting the first material and injecting the second material thereby to bring the first and second cavities into fluid communication. In an alternative embodiment injecting the first material and injecting the second material are performed concurrently. The delay between injecting first and second materials may be short, not allowing enough time for the material injected first fully to set, or may be long enough for the material injected first partially or fully to set.

In a further aspect of the invention there is provided a method of manufacturing a container assembly comprising a frame and a support, the method comprising: providing one of the frame and the support; over injecting the other of the frame and the support on the one of the frame and the support; wherein materials of the frame and the support are incompatible such that they do not bond to one another during the over injecting.

This has the advantage of eliminating any step which would require the assembly of a frame and a support after their manufacture in order to make the complete container assembly ready for shipping to a customer. In one embodiment the material of the frame is a polyethylene and a material of the support is a polyester, a polypropylene or a polystyrene. Preferably the material of the support is a polypropylene. In one embodiment the material of the frame is a polypropylene and the material of the support is a polyester. In that case, preferably the material of the frame is a rubber modified polypropylene. Preferably the material of the support is a polyethylene terephthalate, a polybutylene terephthalate or a polylactic acid.

In one embodiment the material of the support is an amorphous polyethylene terephthalate, desirable a mono amorphous polyethylene terephthalate. In one embodiment the material of the frame is a low density polyethylene or a rubber modified polyethylene.

Desirably the material of the support is an amorphous polyethylene terephthalate and the frame is a polyethylene or rubber modified polypropylene. These are materials which are incompatible so that on over injecting the other of the frame and the support onto the one of the frame and the support, no seal is created between the frame and the support. Additionally, these materials have the required physical properties such that the frame can be made to be less stiff than the support relatively easily.

In a further aspect of the present invention there is provided a container assembly comprising a frame and a support, wherein the support is for supporting a product and comprises a bottom wall and upwardly extending side walls with a flange, said frame extends around the perimeter of the flange and does not lie on top of the flange, wherein at least one member extends between the support and the frame to connect the frame to the support and which member is breakable with a lower force than the frame and support so that by breaking the at least one member the frame can be moved from its position surrounding the support, wherein the frame is of a material different to the material of the support and the material of the frame has a lower stiffness than the material of the support.

This container has the advantage that the frame and support can be made of materials which are compatible (e.g. bond when they come into contact during the method). That is, the materials seal to one another when at least one of them is in the molten state. Therefore, such a container assembly can be made by the method of claim 1 either by injecting the frame and support at the same time or injecting them one after the other. The container assembly could also be made by the method of claim 13. The range of materials which can be used for a container according to this aspect is large as any level of compatibility allows the container to be made.

Desirably a mechanical interlock exists between the support and the frame such that the frame is attachable to the support even after breaking of the at least one member. This is desirable because the support may then be sealed shut with some certainty after having first been opened. The mechanical interlock is present before the at least one member is broken. This allows the dimensions of the parts of the frame and support forming the mechanical overlock to be optimally designed such that a good closure of the container after the at least one member has been broken is possible.

Preferably the container comprises a hinge between the frame and the support so that movement of the frame from its position surrounding the support comprises a rotational movement. In one embodiment the frame and support may be comprised of different grades of polyethylene.

MODE FOR THE INVENTION

Figure 1:
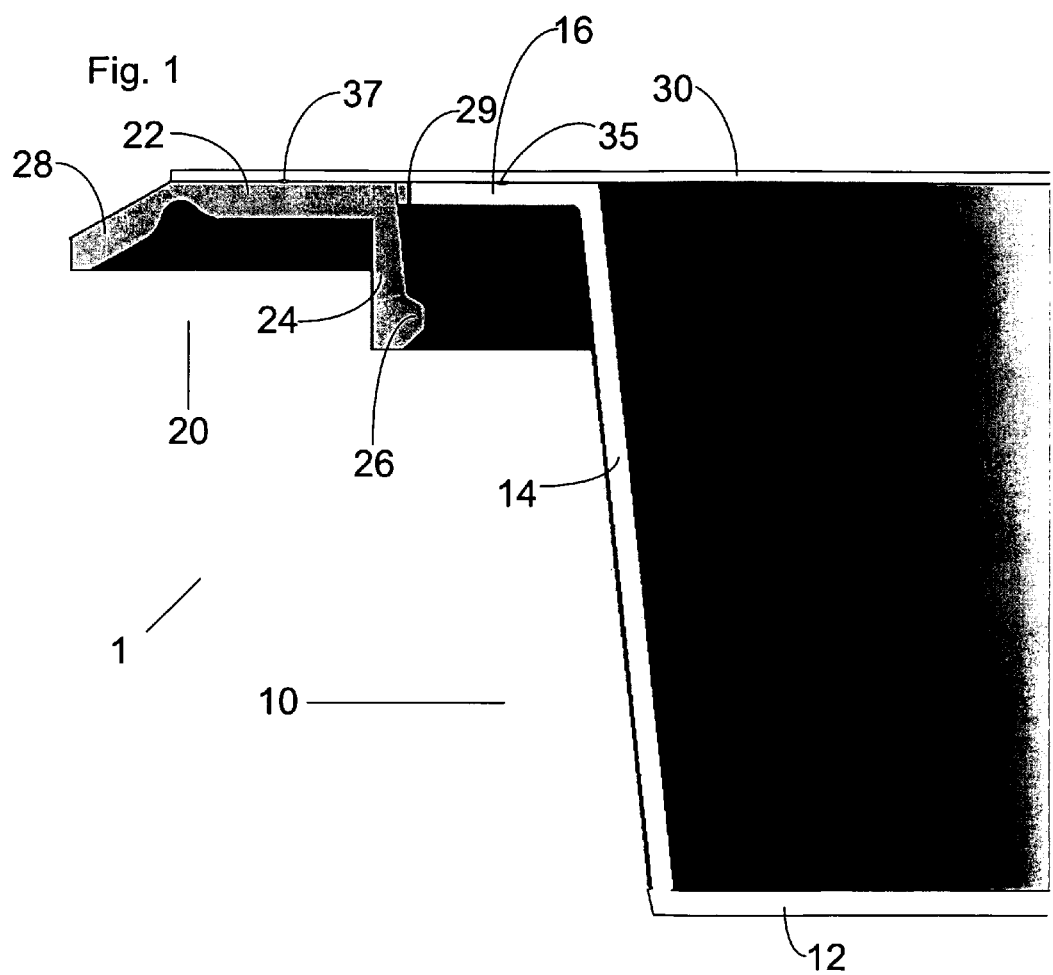
FIG. 1 is a cut-away perspective view of a container assembly according to an embodiment of the present invention.

FIG. 1 is a cut-away perspective view of one embodiment of a container assembly 1 of the present invention. The container assembly 1 may be a rigid or semi-rigid container assembly 1. The container assembly 1 comprises a support 10 and a frame 20.

Support 10 comprises a bottom wall 12 and upwardly extending side-walls 14. A flange 16 may be formed at an upper end of the side-walls 14. The flange 16 extends radially outwardly of the side-walls 14.

The flange 16 is for attaching a flexible cover 30 thereto from above thereby to seal any product placed in the support 10. The flexible cover 30 is sealed to the flange 16 along seal line 35 which is a seal which can easily be broken without substantial damage to the flexible cover 30 or the flange 16 (e.g. it is an easy open seal). The flange 16 forms the periphery of the support 10. The flange 16 comprises a horizontal surface which extends around the side walls 14 of the support 10 and allows the flexible cover 30 to be adhered thereto.

Frame 20 includes a rim 22 which may be flat. In use, the flexible cover 30 is sealed to the rim 22 along seal 37. The seal 37 is preferably a more permanent (e.g. stronger) seal than seal 35. A gap 29 is present between the frame 20 and the support 10 for the majority of the circumference of the support. The frame 20 does not overlie the support 10. The gap 29 is only not present by way of members 40 or a hinge described below in relation to FIG. 2.

The frame 20 also includes a skirt 24. The skirt 24 is shaped to engage with the flange 16 of the support 10 when the container assembly 1 is in the closed state. However, the frame 20 may engage (e.g. mechanically interlock) with the support 10 in a different way. On the opposite side of the rim 22 to the skirt 26 is an optional downwardly projecting flange 28 which serves to stiffen the frame.

In the embodiment illustrated the skirt 24 is provided with a radially inwardly extending projection 26 which makes the inner radius of the frame 20 less than it would be without the projection 26. The projection 26 thereby engages with the flange 16 to form a mechanical interlock so that a user, after breaking the seal between the flexible cover 30 and the flange 16 can re-close the container assembly 1 by replacing the frame 20 on the support 10 into the position illustrated in FIG. 1. The projection 26 desirably projects from the skirt 24 by 1.3-1.5 mm and is placed about 2 mm (axially) from the flange 16. As described below, the mould may not have a mechanical interlock of the frame 20 and support 10, but this may be achieved after removal of those components from the mould by thermal contraction of the frame 20 as it cools.

Alternatively the frame 20 realisably engages with the support 10 by means of an interlocking groove-projection mechanism whereby a projection on the frame 20 fits into a groove on the support 10 or vice versa.

Frame 20 defines a central opening, so that, when container assembly 1 is in the closed state, the support 10 remains uncovered by frame 20 and products can be as easily loaded onto the support 10 as they would be onto any conventional container. When container assembly 1 is in the closed state it is also possible neatly to stack one assembly 1 into the other, as generally done with rigid or semi-rigid containers. This offers two major advantages: the container assemblies 1 of the present invention can be stored and shipped in a most space-efficient way and once they arrive at the packaging facility they can be fed to the packaging machine by any conventional loading equipment.

In the embodiment shown in FIG. 1, container assembly 1 has a rounded rectangular shape however any other desired shape, such as square, round, elliptical etc., can be foreseen for the container assembly 1. Support 10 can be either in the form of a tray, with a bottom wall and upwardly extending side-walls (as shown in FIG. 1) or in the form of a flat or substantially flat dish.

The advantages of a "framed" tray (container assembly 1) is that the customer may use such an assembly in a conventional lidding machine (i.e. a machine that seals a flexible cover 30 as a lid to a tray/container flange). By sealing the flexible cover to both the support flange 16 and the frame 20 he may obtain a hermetically sealed package (because the film is hermetically sealed to the support flange 16) that— once opened by peeling such a seal—can then be reclosed by re-positioning the frame (with the flexible cover 30 still attached thereto) in its original position.

In an embodiment of the invention, the support 10 and frame 20 are connected by a hinge, although more than one hinge may be present. In the embodiment illustrated, the support 10 and frame 20 are not connected by any hinge.

Figure 2:
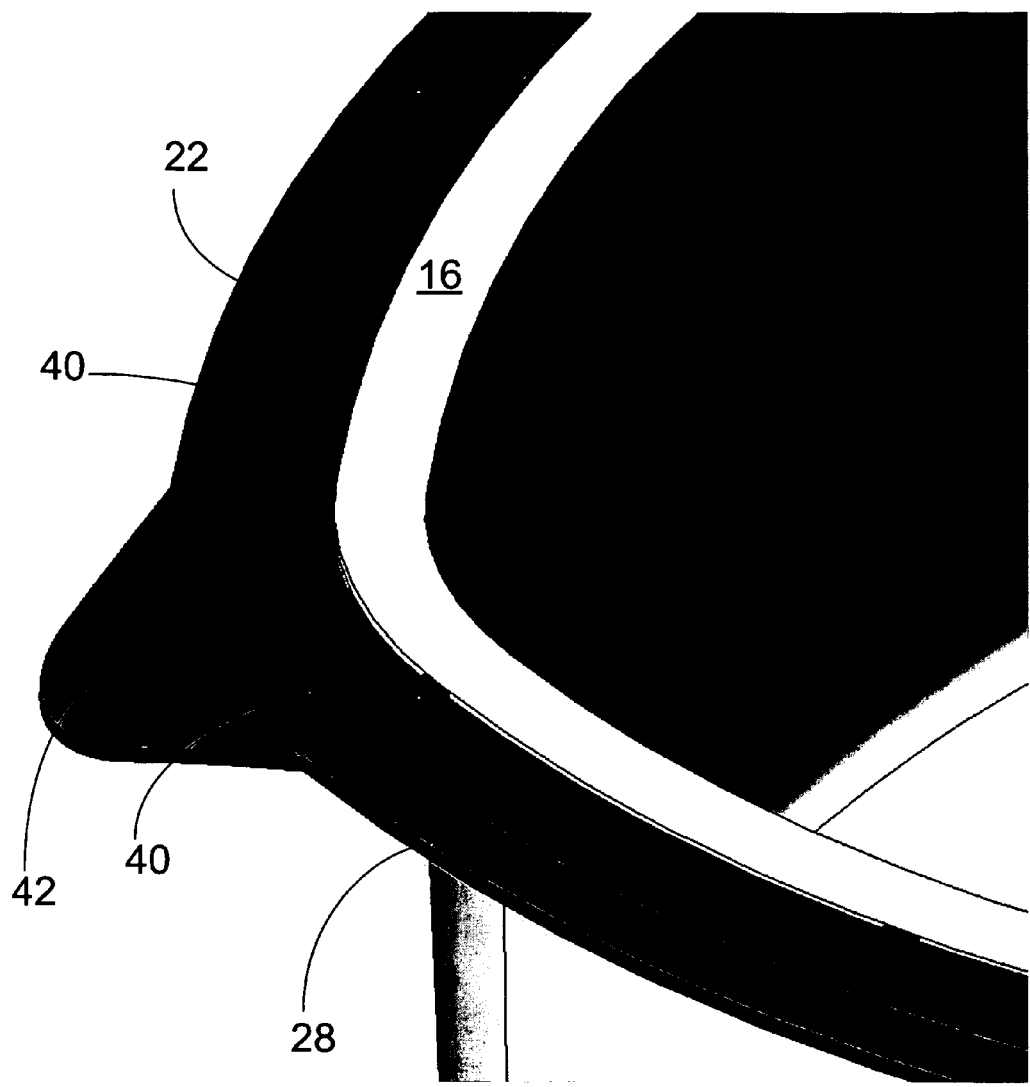
FIG. 2 is a further perspective view of the container assembly of FIG. 1.

As illustrated in FIG. 2, the frame 20 may be provided with a tab 42 which can be grasped for separating the frame 20 from the support 10. In order to remove the flexible cover 30 from the support 10, the frame 20 may be bent through 180° thereby to remove the flexible cover 30 from the support 10 whilst the flexible cover 30 remains attached to the frame 20.

Details regarding how the container assembly 1 is used (how it is filled, how the flexible cover 30 is sealed to the support 10 and frame 20 and how a user opens the container assembly 1 and then re-closes it) can be found in WO 005/039997 the entire contents of which is hereby incorporated by reference thereto. Briefly put, container assembly 1 with frame 20 engaged with support 10 is placed in a container-like counter support present in a suitable packaging machine. The product to be packaged is loaded into the container assembly 1 through the central opening defined by frame and through an open mouth of support 10. This can be done either manually or by means of a tray loading apparatus. A flexible cover 30 (e.g. a thermoplastic film) is then positioned over container assembly 1 and the product in the support 10. The flexible cover 30 can be in the form of a continuous web or can be supplied in the form of separate individual die-cut lids of a suitable size and shape. The atmosphere in the support 10 can be modified either by simply flushing container assembly 1 with the product loaded therein with a suitable gas or gas mixture or by firstly evacuating it and then back-filling with a suitable gas or gas mixture. The flexible cover 30 is then sealed over container assembly 1. When the atmosphere inside the package has been modified or a vacuum has been created, flexible cover 30 is preferably chosen to have a low permeability to gases in order to maintain the atmosphere inside the package unchanged for the whole shelf-life of the product.

In the method of the present invention, flexible cover 30 forms a first seal 37 with rim 22 of frame 20 and a second seal 35 with the surface of the flange 16 and support 10, as shown in FIG. 1. Generally both seals 37 and 35 extend around the whole perimeter of rim 22 of frame 20 and of the flange 16, respectively. Alternatively, it is preferred that at least seal 35 extends in a continuous manner around the flange 16 to ensure hermeticity of the package. To facilitate opening of the final package by the consumer seal 35 is preferably a peelable seal. As used herein the term "peelable seal" refers to a seal which is strong enough to guarantee the hermeticity of the package during its life-cycle but which can be easily opened by tearing apart by hand the two materials that were joined by the seal.

Peelable seals can be obtained, for instance, by sealing together layers of poorly compatible materials or by forming at least one of the layers of the materials joined by the seal with a blend of immiscible or partly immiscible materials. Said layer can be either a heat-sealable surface layer or a layer adjacent to the heat-sealable surface layer and characterized by low cohesive strength. Similar blends are often referred to as "peelable blends". Similarly, the force required to tear apart the two layers is usually referred to in terms of "peel force". A method of measuring the peel force is described in ASTM F-88-00. Acceptable peel force values for peelable seals usually range from 1,900 g/25 mm to 700 g/25 mm. The force required to peel flexible cover 30 from the container assembly at seal 37 can be comparable to, or preferably higher than the force required to peel flexible cover 30 from the container assembly 1 at seal 35.

In one embodiment of the method of the present invention seal 37 is a permanent seal, that is a seal that can not be opened without causing the physical destruction of at least one of the materials joined by the seal. Several methods can be employed to form a permanent seal 37 and a peelable seal 35 between flexible cover 30 and container assembly 1. The flexible cover 30 may be made of a material such as a modified ethylene vinyl acetate resin or copolymer or a modified ethylene acrylate resin or copolymer, for example. Such materials are available from Du Pont under the trademark Appeel®.

Alternatively, the flange 16 could be embossed so that, regardless of the compatibility between the sealing surface of flexible cover 30 and the material of container assembly 1, the seal in the roughened surface could be easily openable.

This packaging method can be performed on currently available tray lidding machines, either automatic or manual, commercially supplied by, e.g., Ross Industries, Inc., Multivac, Inc. or Mondini S.p.A. with only minor modifications. Specific examples of suitable models include the Multivac@ T550 or the Mondini Evoluzione Super. In this type of machines sealing of the thermoplastic film onto the sealing surface of the support is carried out by means of a sealing frame, which forms a continuous seal around the perimeter of the sealing surface of the support. Sealing can be accomplished by any method known in the art, for instance by hot-bar, impulse, RF etc. In an embodiment, a sealing frame 70 can be formed by two separate concentric frames: one for sealing flexible cover 30 onto rim 22 of frame 20 and one for sealing the flexible cover 30 onto the flange 16 of the support 10. The flexible cover 30 may be cut to the desired size at any time, prior to, during or after it is sealed to container assembly 1.

It is desirable to be able to produce the container assembly 1 of FIG. 1 in one process. That is, it is desirable to be able to produce the support 10 and frame 20 so that they are engaged and do not need to be brought together after manufacture and prior to being shipped to a customer.

In the embodiment of FIG. 1, because there is no overlap between the frame 20 and the flange 16, without the presence of a film 30 the frame 20 would fall downwards away from the support 10 without a means being present for holding it in place. Such a means is illustrated in FIG. 2 and comprises one or more (breakable) members 40 which extend between the frame 20 and the support 10 thereby to attach the frame 20 to the support 10. The members extend over gap 29. The member 40 is dimensioned such that it is breakable with a lower force than the frame 20 and support 10 (e.g. it is a breakable member) without damaging the flexible cover 30 or support 10 so that by breaking the at least one member 40 the frame 20 can be moved from its position surrounding the support 10.

When a user wishes to gain access to the product placed in the support 10, the members 40 are broken so that the frame 20 can then be bent backwards (or the members 40 are broken during bending backwards of the frame 20) and the flexible cover 30 peeled off from the support 20 (by breaking seal 35) by movement of the frame 20. Because of the configuration of the frame 20 and support 10, even if the seals 35, 37 are of the same strength (or seal 37 is weaker than seal 35), seal 35 will break in preference to seal 37. When the user wishes to reclose the container assembly 1, the frame 20 with the flexible cover 30 still adhered can be pushed back over the flange 16 of the support 10. The presence of the flexible cover 30 prevents the frame 20 from falling further downwards and the mechanical interlock formed by the projection 26 and the flange 16 prevents the flexible cover 30 from easily being lifted off from the support 10, for example by a gust of wind or during handling by the end user.

The container assembly 1 has, in one embodiment, at least four members in the case where the frame is not hinged to the support 10. If the frame 20 is hinged to the support 10, and open along three sides, then in one embodiment a minimum of two members 40 are present. The function of the members 40 is to keep the frame 20 in position on the support 10 during pack closing.

The easy removal of the film 30 is only achievable because of the use of two different materials for the support 10 and the frame 20. That is, the frame 20 may be made of a material which is less stiff than the material of the support 10. The frame 20 is more flexible and the tray 10 more rigid. As a result, the frame 20 may be bent through 180° thereby facilitating removal of the flexible cover 30 from the flange 16. The flexural modulus of the frame may range from 90 to 700 MPa, preferably from 100 to 500 MPa and most preferably from 150 to 400 MPa. This compares to a range of 900 to 3500 MPa flexural modulus for the support 10. The materials of the frame 20 and support 10 are compatible (e.g. seal together during manufacture) because there is only contact between the support 10 and frame 20 at small locations where bonding is desired (i.e. at the members 40 or the hinge). Thus, no extra sealing step is required. The support 10 and frame 20 could be made from the same type of material (for example polyethylene) of different grades (e.g. having different densities). For example, the frame could be made of low density polyethylene and support 10 of high density polyethylene. Different grades of polyethylene include one or more of the following: 1) medium density polyethylene ("MDPE"), for example having a density of from 0.926 to 0.94 g/cm3; 2) linear medium density polyethylene ("LMDPE"), for example having a density of from 0.926 to 0.94 g/cm3; 3) linear low density polyethylene ("LLDPE"), for example having a density of from 0.915 to 0.930 g/cm3; and 4) very-low or ultra-low density polyethylene ("VLDPE" and "ULDPE"), for example having density below 0.915 g/cm3.

The support 10 has a thickness of around 600-700 μm, but may be up to 1 mm or more. The members 40 may have a smaller thicknesses, for example down to 0.3 mm. A range of from 0.3-1.5 mm is possible and a desired range is 0.3-1 mm.

Ideally the member 40 is made of the same material as the support 10 because that material is more rigid. However, the member 40 could also be made of the more flexible material coming from the frame 20.

The frame has a typical thickness of the range of 0.5-1.5 mm, preferably 0.5-1 mm. Different sections of the frame 20 may have different thicknesses.

Figure 3:
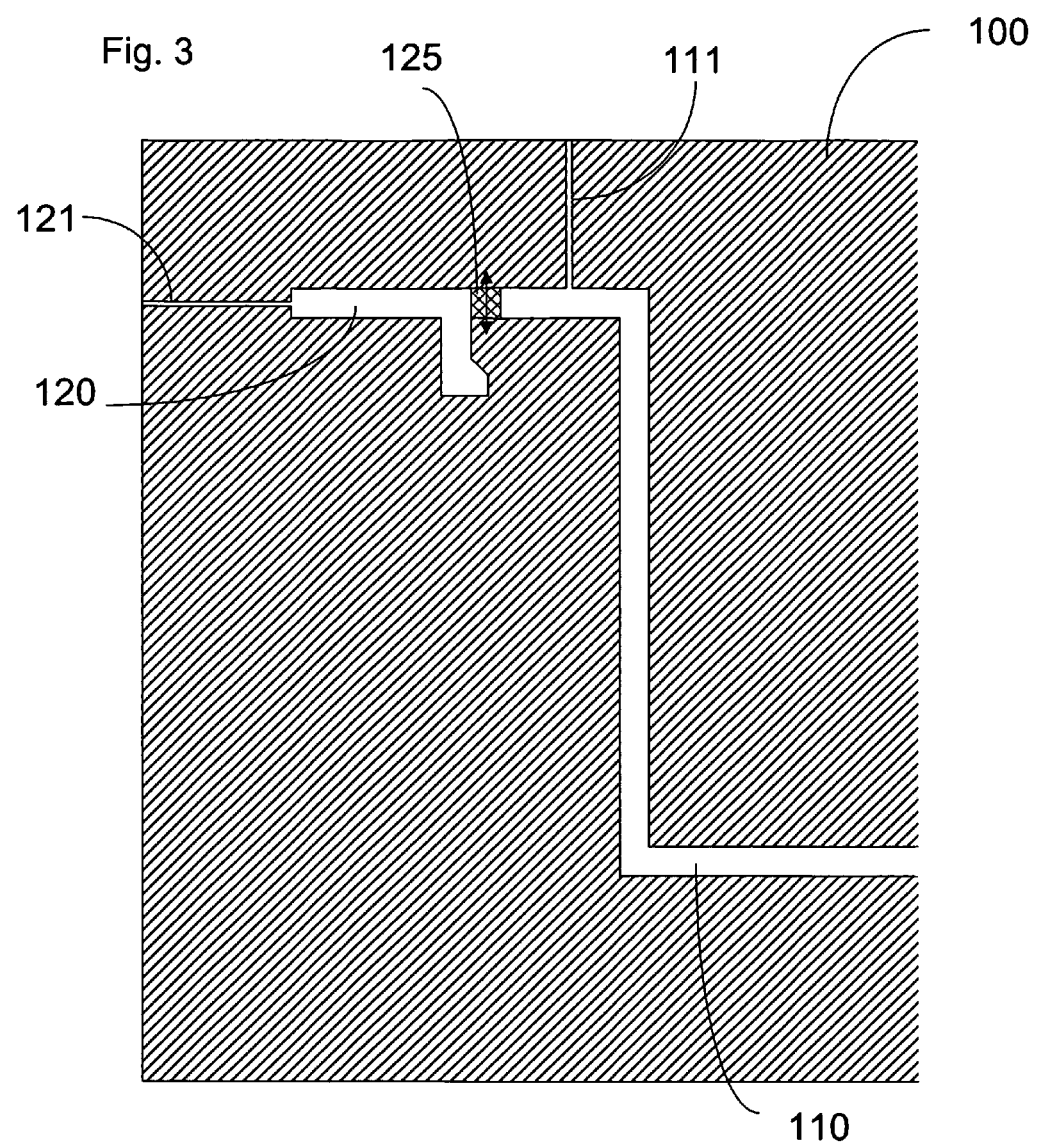
FIG. 3 is a schematic illustration in cross-section of a mould used in a method of the present invention.

The container of FIGS. 1 and 2 can be manufactured in a single mould as is described below with reference to FIG. 3. It is possible to inject the frame 20 and the support 10 in a single mould using different materials for the frame 20 and support 10 (bi-component injection moulding). The container assembly 1 is optimised in order to allow breakage of the members 40 between the frame 20 and the support 10 when opened by the final customer and reclosability after extraction of part of the product.

In one embodiment of the present invention this is achieved by injection moulding both the support 10 and the frame 20 in the same mould 100. This can be achieved because there is no overlap between the frame 20 and the support 10. That is, contrary to what is disclosed in WO 2005/039997, the frame 20 does not sit on top of the flange 16 of the support 10. This allows materials which would otherwise stick to each other to be injected at the same time or injected shortly one after the other into the same mould 100 because of the presence of gap 29 between the frame 20 and the flange 16. If there were no gap 29 (for example if the frame 20 sat on top of the support 10), the two materials when they are injected would adhere to one another, unless the two materials are incompatible. However, providing incompatible materials reduces the choice of materials available for use and might deleteriously increase manufacturing costs.

A single mould 100 is provided. A first cavity 110 in the mould defines the desired shape of the support 10. A first material may be injected into the first cavity 110 through a first inlet 111.

A second cavity 120 is defined in the mould. The second cavity 120 has the desired shape of the frame 20. The second material can be injected into the second cavity 120 through a second inlet 121.

In one embodiment material is injected into the first cavity 110 at the same time that the second material is injected into the second cavity 120. The two materials may be different so that the timing and pressure of injection may need to be controlled in order to ensure that all or at least the majority of the frame 20 comprises the second material and all or majority of the support 10 comprises the first material.

The first cavity 110 and second cavity 120 are adjacent so that the frame 20 and support 10 are moulded in place with the frame 10 extending around the side walls 14 of the support 10 as in the assembled state illustrated in FIG. 1. This has the advantage that no further steps need to be taken after the container assembly 1 is removed from the mould 100 (for example placing of the frame 20 onto the support 10).

As stated above with regard to FIG. 2, the frame 20 is attached to the support 10 through at least one member 40.

There may be two members 40 at each corner of the package, as illustrated. For the embodiment where the frame 20 is not hinged to the support 10, there are preferably at least four members 40, for example at each corner. In the embodiment where the frame is hinged along one edge to the support 10, there may be as few as two members 40. However, there may be more members and their dimensions may vary according to how many there are and how frequently they are spaced.

Along at least part of the periphery of the flange 16 the gap 29 is present between the frame 20 and the flange 16. At discreet locations the first cavity 110 may be in fluid communication with the second cavity 120. One location would be at a hinge between the support 10 and the frame 20. Other locations are at the members 40. These locations where there is fluid communication may be blocked by a moveable member 125 of the mould 100. This allows moulding of the support 10 and frame 20 one after the other (i.e. not at the same time but without opening the mould 100 between moulding the frame and container). That is, one of the support 10 and frame 20 are injected first whilst the moveable member 125 blocks fluid communication between the first and second cavities 110, 120. The moveable member 125 is then moved so that fluid communication exists between the first and second cavities 110, 120, one of which is already filled with material. The other of the first and second cavities 110, 120 are then injected with material. Because the first and second materials are compatible they will seal together at the locations where the moveable member 125 has been removed. Thereby it becomes possible to form a container assembly according to FIGS. 1 and 2 in which the support 10 and frame 20 are made of different materials but are still connected together.

There may be some shrinkage after moulding, particularly of the frame 20. With the correct sizing in the mould 100, this can be used advantageously to bring the frame 20 and support 10 closer together. This may aid in ensuring reclosability after first use, for example.

For the embodiment of FIGS. 1 and 2, the following are examples of suitable combinations of materials.
  Frame: polyethylene (LDPE, LLDPE, MDPE, mLLDPE) and blends thereof
  Support: HDPE
  Flexible lid: peelable on PE (typically blend of PE and PB (polybutene))
  Frame: rubber modified PP
  Support: PP
  Flexible lid: peelable on PP (premade blends available from global suppliers)
  Frame: EVA
  Support: HDPE
  Flexible lid: peelable on PE (typically blend of PE and PB (polybutene))

Figure 4:
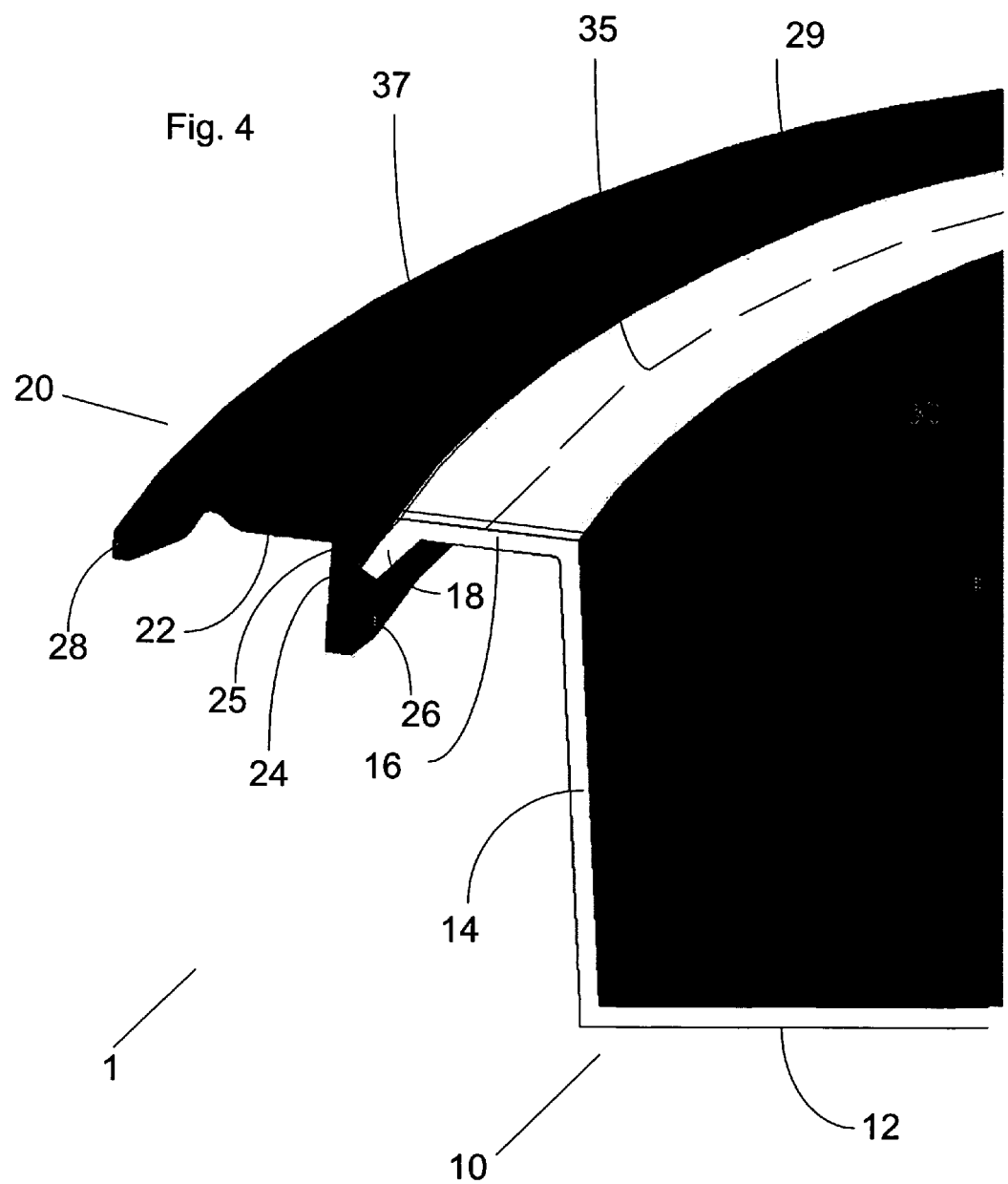
FIG. 4 is a cut-away perspective view of a container assembly manufactured by the method of the present invention.

FIG. 4 illustrates a further embodiment which is the same as the embodiment illustrated in FIGS. 1 and 2 except as described below. In the embodiment of FIG. 4 there is no connection between the support 10 and the frame 20. Instead, a projection 25 of the frame engages with (e.g. lies on) an outward and downward extending part 18 of the flange 16 thereby to prevent the frame from falling downwards in the absence of the film 30. This embodiment is likely to be without a hinge between the support 10 and frame 20.

Because the fit of the frame 20 on the support 10 is quite close, it is difficult to make the container assembly 1 of FIG. 4 using the method described above with reference to FIG. 3. This is because a wall in the mould 100 between the first cavity 120 defining the frame 20 and the second cavity 110 defining the support 10 would be too weak. Therefore in a method to manufacture the container assembly 1 of FIG. 4, the first and second cavities 110, 120 are provided in fluid communication with one another. Bi-component injection moulding or injection of a first material in the first cavity and a second material in the second cavity one shortly after the other (or vice versa) is possible (with or without a moveable member 125) provided that the materials used for the frame 20 and support 10 are incompatible. Incompatible means materials which do not seal to one another when bi-component injection moulded or injected shortly one after another (e.g. in the method of the invention).

In an alternative embodiment one of the support 10 and frame 20 is provided in its completed form and the other of the frame 20 and support 10 are then over injected onto one of the frame 20 or support 10 which is initially provided. Thus, for example, if a support 10 is provided, a mould is provided which defines the frame 20 incompletely. The definition of the frame 20 is completed by positioning the already formed support 10 in the correct position on the mould thereby completing the definition of the frame 20. The material forming the frame 20 can then be injected into the mould and the frame 20 is formed in place on the support 10.

The container assembly disclosed in WO2005/039997 may also be produced by both of the above alternative ways of manufacturing the container assembly 1 of FIG. 4.

Figure 5:
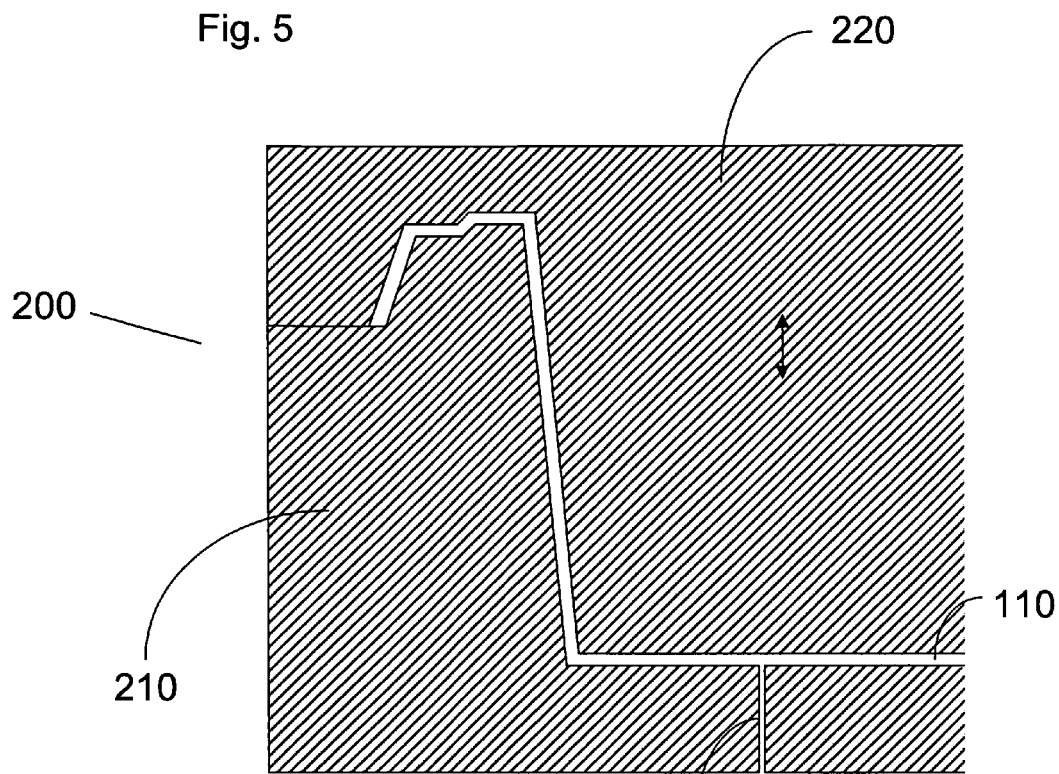
FIG. 5 is a schematic illustration in cross-section of a mould used in a method of the present invention to manufacture the support of a container of FIG. 4.
Figure 6:
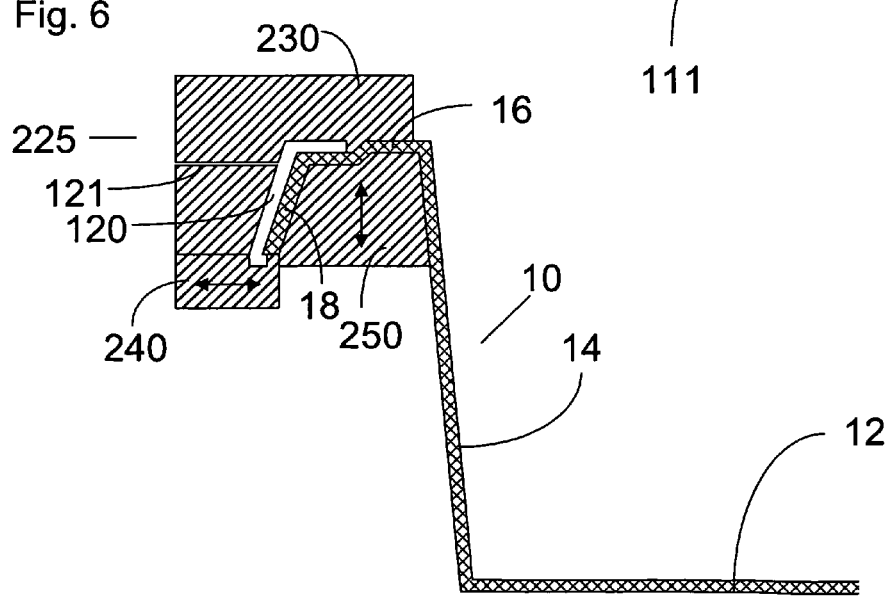
FIG. 6 is a schematic illustration in cross-section of a mould used in an over-injection method of manufacturing the container assembly of FIG. 4.

FIGS. 5 and 6 illustrate the manufacture of a container assembly according to WO2005/039997 using an over injection method. The same method may be used to manufacture the container assembly of FIG. 4.

The difference between the container assembly of WO2005/039997 and that of FIG. 4 is that the flange 16 of the WO2005/039997 support 10 is stepped to have two levels. An inner portion of the frame 20 lies on top of the lower part of the flange 16. Thus the top surface of the flange 16 (which is an innermost part of the flange 16) is substantially coplanar with a top surface of the frame 20. The flexible cover 30 is sealed to the frame 20 and the support 10 in substantially the same plane. The frame 20 has a flange which abuts with the outward and downward extending part 18 of the flange 16 of the support 10. A projection similar to the projection 26 of the FIG. 4 embodiment engages the frame 20 with the flange 16.

In the method illustrated in FIGS. 5 and 6, the support 10 is first manufactured and the frame 20 then over injected onto the support 10. However it may be the other way round with the frame 20 being manufactured first and support 10 being over injected onto the frame 20.

FIG. 5 illustrates a mould 200 with a single cavity 110 defining the shape of the support 10. The first material may be injected into the cavity 110 through the first inlet 111. The mould 200 may be comprised of two parts 210, to 220, one of which is movable so that after injection of the first material the mould may be opened and the support 10 removed.

FIG. 6 illustrates a mould 225 which may be used for over injection of the frame 20 onto the flange 16 of the support 10. The support 10 is provided to the mould 225 and positioned adjacent a recess in the mould 225 so that the support defines at least one side wall of the cavity 120 with the remainder of the cavity 120 being defined by the mould (e.g. side walls of the recess). In combination with the walls of the mould and the support 10 the cavity 120 defines the shape of the frame 20. A second inlet 121 allows injection of second material into the cavity 120 thereby to over inject the frame 20 onto the support 10.

The mould 225 may be made of more than one part 230, 240 at least one of which may be moveable. A member 250 may be provided to engage with and move the support 10 into place. The member 250 may also support the support 10 during injection of the second material such that the support 10 does not deform. The member 250 may alternatively or additionally clamp the support 10 in place relative to the mould 225.

Because of the complex shape of the frame 10 and the fact that it extends at least partly around the flange 16, it may be necessary to provide the parts 230, 240 of the mould 225 defining the cavity 120 to be movable. For example, part 240 of mould 225 may be movable to allow the support 10 to be engaged with the first part 230 of the mould 225 by vertical (as illustrated) movement alone. Once the support 10 is in place, horizontal movement of the second part 240 of the mould 225 can close the cavity 120 and form it into its desired shape. Once the support 10 is in place and the cavity closed, over injection of second material into the cavity 210 through inlet 121 completes the process. The frame may then be moved from the mould 225 attached in place to the support 10. In this way the container assembly can be manufactured in the assembled conditions and a further assembly step is not required.

Both of the above alternative ways of manufacturing the container assembly 1 of FIG. 4 and of WO2005/039997 require that the materials of the frame 20 and support 10 are incompatible. Example materials include any polyethylenes (with the exception of HDPE which is too rigid) onto a polyester such as a polylactic acid (PLA), a polybutylene terephthalate (PBT), or a polyethylene terephthalate (PET) such as mono amorphous polyethylene terephthalate, or rubber modified polypropylene onto a polyester such as a polylactic acid (PLA), a polybutylene terephthalate (PBT), or a polyethylene terephthalate (PET) such as mono amorphous polyethylene terephthalate, or any polyethylene (with the exception of HDPE which is too rigid) onto a polypropylene support. The support 10 may include a polystyrene. The option with rubber modified polypropylene is preferred because rubber modified polypropylene shrinks less after moulding than PE.

Thus the container assembly 1 may be injected and formed without any physical link (e.g. no members 40) by injecting the frame 20 (or support 10) already clipped onto the support 10 (or tray 20).

The use of different materials for the frame 20 and support 10 allows different colours to be used for those two parts.

The invention claimed is:

1. A method of manufacturing together a support (10) and frame (20) of a container assembly (1), the method comprising:

providing a single mold (100) with a first cavity (110) defining the support (10) and a second cavity (120) defining the frame (20);

injecting first material into the first cavity (110); and injecting second material into the second cavity (120);

wherein the first and second materials are different materials, and wherein the frame (20) is attached to the support (10) by at least one member (40) extending between the support (10) and the frame (20), wherein the member (40) is breakable with a lower force than the frame (20) and support (10) so that by breaking the at least one member (40) the frame (20) can be moved from its position surrounding the support (10), and wherein during injecting said first material and/or during injecting said second material a hinge between the frame (20) and support (10) is formed such that when said member (40) is broken the frame (20) can be rotated relative to the support (10) without becoming detached from the support (10).

2. The method of claim 1, wherein the first cavity (110) and second cavity (120) are adjacent so that the frame (20) and support (10) are molded in place with the frame (20) extending around side walls of the support (10).

3. The method of claim 1, wherein the frame (20) is removably attached to the support (10) by a mechanical interlock between a part of the frame (20) and a part of the support (10).

4. The method of claim 3, wherein the first and second materials are incompatible such that they do not bond to one another.

5. The method of claim 4, wherein the first material comprises amorphous polyethylene terephthalate, and the second material comprises a low density polyethylene or a rubber modified polypropylene.

6. The method of claim 1, wherein injecting the first material is performed after injecting the second material or vice versa.

7. The method of claim 6, further comprising moving part of said mold between injecting said first material and injecting said second material, thereby to bring the first and second cavities into fluid communication.

8. The method of claim 1, wherein injecting the first material and injecting the second material are performed concurrently.

* * * * *